United States Patent
Liu et al.

(10) Patent No.: US 10,319,529 B2
(45) Date of Patent: Jun. 11, 2019

(54) ONE-SIDED CAPACITOR FOILS AND METHODS OF MAKING ONE-SIDED CAPACITOR FOILS

(71) Applicant: Kemet Electronics Corporation, Simpsonville, SC (US)

(72) Inventors: Yanming Liu, Simpsonville, SC (US); Jessica P. Love, Simpsonville, SC (US); Brandon Summey, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 322 days.

(21) Appl. No.: 14/180,946

(22) Filed: Feb. 14, 2014

(65) Prior Publication Data

US 2014/0223710 A1    Aug. 14, 2014

Related U.S. Application Data

(60) Provisional application No. 61/764,667, filed on Feb. 14, 2013.

(51) Int. Cl.
| | |
|---|---|
| *H01G 4/38* | (2006.01) |
| *H01G 4/005* | (2006.01) |
| *H01G 9/00* | (2006.01) |
| *H01G 9/055* | (2006.01) |
| *H01G 4/008* | (2006.01) |

(52) U.S. Cl.
CPC ............ *H01G 4/38* (2013.01); *H01G 4/005* (2013.01); *H01G 4/008* (2013.01); *H01G 9/0029* (2013.01); *H01G 9/055* (2013.01); *Y10T 29/302* (2015.01); *Y10T 29/43* (2015.01)

(58) Field of Classification Search
CPC .......... H01G 4/005; H01G 4/38; H01G 9/005; H01G 9/0029; Y10T 29/302; Y10T 29/43
USPC ............................................. 29/25.41, 25.42
See application file for complete search history.

(56) References Cited

U.S. PATENT DOCUMENTS

| | | | |
|---|---|---|---|
| 4,090,231 A | 5/1978 | Millard | |
| 6,785,147 B2 | 8/2004 | Miki et al. | |

(Continued)

FOREIGN PATENT DOCUMENTS

| | | |
|---|---|---|
| JP | 2003-124069 | 4/2003 |
| JP | 2008-282835 | 11/2008 |

(Continued)

OTHER PUBLICATIONS

ISA/KR; International Search Report and Written Opinion: I.A. No. PCT/US2014/016484; Kemet Electronics Corporation; dated Jun. 19, 2014.

(Continued)

*Primary Examiner* — Peter Dungba Vo
*Assistant Examiner* — Azm A Parvez
(74) *Attorney, Agent, or Firm* — Joseph T. Guy; Patent Filing Specialist, Inc.

(57) ABSTRACT

A method of forming a capacitor is described as is an improved capacitor formed with a one-sided capacitor foil. The method includes:
providing a foil comprising a conductive core and a high surface area on each side of a first side and a second side of the core;
removing at least a portion of the high surface area on the first side of the core; and forming a conductive layer on the dielectric.

15 Claims, 2 Drawing Sheets

(56) References Cited

U.S. PATENT DOCUMENTS

| | | | |
|---|---|---|---|
| 7,085,127 B2 * | 8/2006 | Goldberger | H01G 9/012 29/25.03 |
| 7,745,281 B2 | 6/2010 | Prymak et al. | |
| 7,833,292 B2 | 11/2010 | Brenneman et al. | |
| 2002/0075633 A1 | 6/2002 | Shimada et al. | |
| 2005/0141169 A1 | 6/2005 | Yamasaki | |
| 2005/0213286 A1 | 9/2005 | Michel et al. | |
| 2006/0254922 A1 * | 11/2006 | Brevnov | C23C 18/1844 205/205 |
| 2006/0256507 A1 * | 11/2006 | Yoshida | H01G 9/012 361/540 |
| 2007/0010063 A1 * | 1/2007 | Nakayama | H01L 28/57 438/381 |
| 2008/0218296 A1 | 9/2008 | Prymak et al. | |
| 2009/0067120 A1 * | 3/2009 | Matumoto | H01G 9/012 361/524 |
| 2012/0137929 A1 * | 6/2012 | Nguyen | B41C 1/1008 106/287.2 |

FOREIGN PATENT DOCUMENTS

| | | |
|---|---|---|
| JP | 2009-059881 | 3/2009 |
| JP | 2009-267287 | 11/2009 |
| JP | 2010-186796 | 8/2010 |

OTHER PUBLICATIONS

ISA/KR; International Search Report and Written Opinion; I.A. No. PCT/US2014/016450; Kemet Electronics Corporation; dated Jul. 9, 2014.

* cited by examiner

ONE-SIDED CAPACITOR FOILS AND METHODS OF MAKING ONE-SIDED CAPACITOR FOILS

CROSS-REFERENCE TO RELATED APPLICATIONS

The present invention claims priority to U.S. Provisional Application No. 61/764,667, filed Feb. 14, 2013, which is incorporated herein by reference.

BACKGROUND

The present invention is related to one-sided foils, particularly, for use in capacitors and improved methods of making one-sided foils. Even more specifically, the present invention is directed to capacitors made from one-sided capacitor foils.

Miniaturization is an ongoing desire in the electronics industry. This desire is driven by consumer demands for smaller, more functional, devices with decreased size and weight. This demand is contrary to the demand for decreased cost. A common direction for capacitors in the industry is miniaturization. Many development efforts have focused on miniaturization and one aspect of this development is referred to in the art as embedded capacitance as represented in U.S. Pat. No. 7,745,281 which is incorporated herein by reference. It is common in the art to use a high surface area foil in order to provide increased capacitance. Methods of forming this high surface area include etching or deposition methods.

With embedded technology it is desirable to only have high surface area on one side of the foil. Having the high surface area surface on only one side maximizes the capacitance and reduces the thickness of the device simultaneously. This also allows for treating the non-high surface area side in such a way as to prepare it for use in the embedded application, including providing a surface that is better suited for electrical connection.

Additive processes can achieve this one sided structure. However, additive technologies require excessive cost in order to manufacture one-sided foils. The commercially available capacitor foils are still preferably formed by electrochemical etching. Electrochemical etching is typically done in large volumes and thus the cost has been significantly reduced.

Methods of achieving a final device without the second high surface portion have included mechanical methods of polishing or lapping the material away. This is typically done in finished capacitors such as in U.S. Pat. No. 7,833,292 which is incorporated herein by reference. Mechanically removing the material is difficult to control when handling the finished components and may also damage the thin components.

The present invention provides a novel method of forming one sided foil in a way that takes advantage of commercially available foils. The present invention also provides an improved method for manufacturing capacitors using the one-sided foil.

SUMMARY

It is the object of this patent to provide an improved capacitor and an improved method for manufacturing a capacitor from a one-sided capacitor foil.

A particular feature of the invention is the ability to provide one-sided foils with only one side having high surface area thereby providing capacitors made thereon with improved properties.

These and other advantages, as will be realized a method of forming a capacitor. The method includes:
providing a foil comprising a conductive core and a high surface area on each side of a first side and a second side of the core;
removing at least a portion of the high surface area on the first side of the core; and forming a conductive layer on the dielectric.

DESCRIPTION

The present invention is directed to an improved method of making capacitor foil, and more particularly, capacitors made from the improved capacitor foil.

Commercially available capacitor foils typically begin with a valve metal foil, preferably aluminum or tantalum. This foil is then treated electrochemically to remove portions of both sides of the foil and that removal creates a high surface area on both sides of the capacitor foil. This invention uses this commercial foil and treats one side of the foil so as to remove the high surface area portion of the foil.

The instant treatment process is suitable for removing at least a part of the high surface area portion, all of the high surface area portion, or part of the capacitor foil core in addition to the high surface area portion on one side of the foil.

One method of removing the portions of the foil is by chemically etching the side which is to be removed. Many methods can be used to protect the opposite side of the foils from the etching process such as masking or lamination of an inert material to one side. A preferred method of chemically etching the high surface area portion of the foil is the use of alkali solution and more preferably a solution containing sodium hydroxide or potassium hydroxide.

Another method of selectively removing one side of the foil is the use of physical methods to remove the high surface area portion. Physical methods include plasma etching, polishing and laser ablation. Plasma etching is preferred due to its innate ability to control the precision of the removal.

The invention will be described with reference to the figures forming an integral, non-limiting, component of the disclosure. The figures are intended to facilitate an understanding of the invention and are not intended to limit the invention in any way. Throughout the figures various elements will be numbered accordingly.

Figure 1:
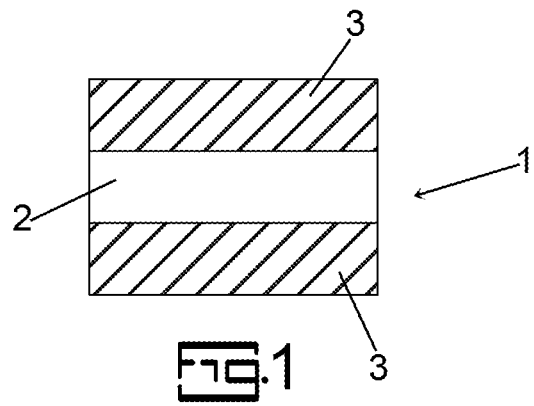
FIG. 1 is a cross-sectional schematic view of a two-sided foil.
Figure 2:
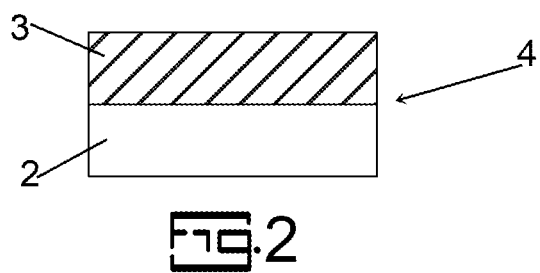
FIG. 2 is a cross-sectional schematic view of a one-sided foil.

A conventional two-sided foil is illustrated in schematic cross-sectional view in FIG. 1. In FIG. 1, the capacitor foil, 1, comprises a capacitor foil core, 2, preferably a valve metal preferably selected from aluminum, tantalum, titanium, niobium, zirconium and hafnium and most preferably aluminum or tantalum. A high surface area layer 3, is on each side of the core. In FIG. 2, a one-sided capacitor foil, 4, is illustrated in schematic cross-sectional view wherein one high surface area layer has been removed resulting in a core and high surface area layer on one side thereof.

The one-sided foil is prepared by removing one-side of a two-sided foil wherein each side has been previously treated to increase the surface area and to optionally grow the oxide surface. For the purposes of the instant invention a roughened surface refers to a surface with at least 25 angstroms of oxide on the surface and a surface roughness of at least 0.1 $m^2/g$. After treatment the surface opposite the untreated surface has no more than 15 angstroms of oxide on the surface and a roughness of no more than 0.01 $m^2/g$. Two-sided capacitor foil is commonly commercially available from many sources. In the process one side is protected either by physically blocking the removal process, such as by masking, or by selectively modifying the side to be removed in a directed manner without detriment to the opposite side such as occurs with physical methods. One side can be removed by a chemical etching process, preferably an alkali, and most preferably in sodium hydroxide of potassium hydroxide solution resulting in a core layer, with no more than a layer of oxide as naturally formed in ambient air, while simultaneously achieving a surface roughness of no more than 0.01 $m^2/g$.

In one embodiment a side is removed by physical means selected from plasma etching, laser ablation or polishing to remove the roughed layer thereby achieving a core layer, with no more than a layer of oxide as naturally formed in ambient air, while simultaneously achieving a surface roughness of no more than 0.01 $m^2/g$.

To form a capacitor a conductive layer is formed on the unchanged roughened surface area as set forth further herein.

Figure 3:
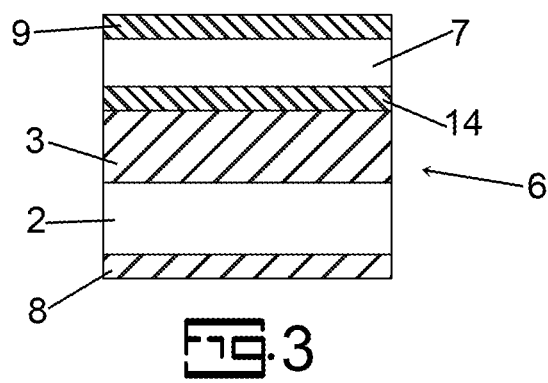
FIG. 3 is a cross-sectional schematic view of an embodiment of the invention.

An embodiment of the invention will be described with reference to FIG. 3 wherein provided is a partial cross-sectional schematic view of a capacitor, 6. In FIG. 3 the core, 2, and high surface area layer, 3, are as described in FIG. 2. A dielectric, 14, is optionally formed on the high surface area layer after removal of the roughened surface from the opposite face. However, it is generally preferable to form the dielectric prior to removal of the roughened area from the opposite side wherein the roughened area is an oxide and functions as the dielectric. A conductive layer, 7, is formed on the high surface area layer, 3, thereby forming a capacitive couple represented by the conductive core, 2, and conductive layer, 7, separated by high surface area oxide layer, 3, as an oxide which functions as the dielectric between the conductive layers. The core is preferably the anode and the conductive layer, 7, is preferably the cathode of the capacitive core. An optional, but preferred, anode termination, 8, is in electrical contact with the core, 2, and a cathode termination, 9, is in electrical contact with the conductive layer, 7. The core may be directly electrically connected to a circuit trace and in this instance the anode termination, 8, may represent a conductive adhesive suitable for electrically connecting a capacitor to a circuit.

The conductive layer is preferably manganese dioxide or a conductive polymer neither of which are conducive to formation of an electrical connection thereto. Therefore, the cathode termination, 9, represents those layers necessary to form a surface which facilitates electrically conductive adhesion to a lead or to a circuit trace.

Figure 4:
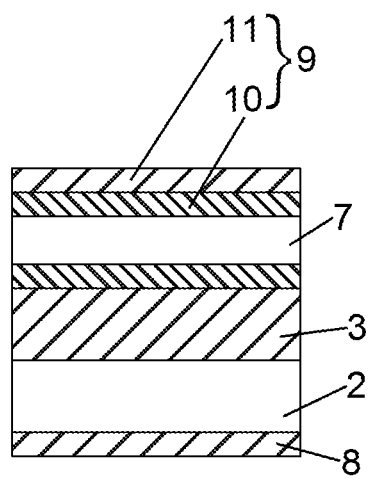
FIG. 4 is a cross-sectional schematic view of an embodiment of the invention.

The conductive layer preferably includes at least two layers as illustrated in FIG. 4. In FIG. 4, the conductive layer, 9, preferably comprises a conductive polymer layer or manganese dioxide layer. Due to the difficulty in bonding to a conductive polymer layer at least one carbon layer, 10, is applied thereon. Carbon layers over conductive polymer layers are well known in the art. Carbon layers are known to be difficult to form an electrical contact to and it is therefore preferable to apply at least one metal layer, 11, over the carbon layer wherein the metal layer includes a metal, such as nickel, copper, silver, gold and the like either as part of a conductive paste or as a plated metal layer. The carbon layer may be a carbon paint layer. The metal layer may be a metal paint layer or a plated metal layer. It is understood for the purpose of this invention that the term "paint" includes any filled system that contains a binder agent and a conductive particle. Conductive paint layers are preferred due to the specificity with which they can be applied.

Figure 5:
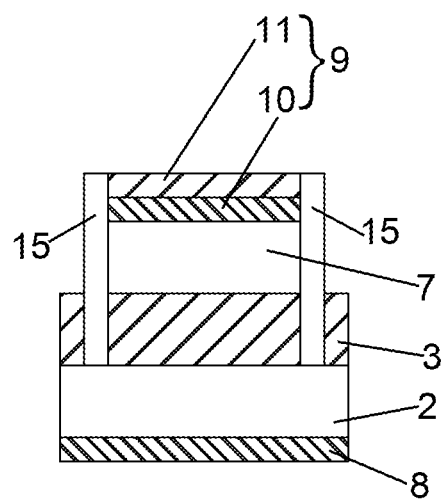
FIG. 5 is a cross-sectional schematic view of an embodiment of the invention.

An embodiment of the invention is illustrated in FIG. 5. In FIG. 5 a capacitor is illustrated in cross-sectional schematic view. The core, 2, high surface area, 3, conductive layer, 7, optional anode termination, 8, and cathode termination 9, are as illustrated in FIG. 4. An isolating material, 15, circumscribes an area within which the conductive layer, or cathode, is formed. This allows discrete areas of the foil to be formed into a capacitive couple and the discrete capacitive couples can be isolated, such as by dicing or cutting, or various components can be shared as would be realized to those of skill in the art. In some embodiments sections of the core may be isolated such that a single capacitor has a unique anode or multiple capacitors may share either an anode or a cathode as would be realized to those of skill in the art.

The roughened surface of the capacitor foil can be made by additive or subtractive methods that are known in the industry, such as the electrochemical etching of the foil or the formation of powder particles of a valve metal sintered to a foil. The dielectric typically mimics, at least in part, the undulations of the roughened surface.

The cathode layer may comprise multiple layers preferably selected from layers of conductive polymer, manganese dioxide, conductive carbon ink, conductive metal ink and the like. Other materials can be used to form this conductive cathode layer including but not limited to, ionic salts, liquid electrolytes, or other suitable current conducting materials. As would be realized the isolating material restricts the location of the cathode material so as to create individual capacitive couples with a distinct cathode for each capacitive couple. It would also be understood that adjacent capacitive couples can be closely spaced allowing sufficient room to separate the individual capacitors if desired. The cathode layer is a solid electrolyte. The solid electrolyte layer may consist of one or more layers of one or more conductive polymers. Preferred conductive polymers include polypyrrole, polyaniline and polythiophene. A particularly preferred conductive polymer is the polymer of 3,4-ethylenedioxythiophene. The conductive polymer may be applied from a solution or suspension or the conductive polymer may be formed in-situ by coating a monomer and oxidizer sequentially. In-situ formation is less preferred due to the complexities of incorporating the process into conventional in-line automated processes since the number of process steps is necessarily increased with in-situ formation. Furthermore, in-situ polymer formation typically provides a thicker, less dense, polymer layer which is less desirable in most applications. The polymer layer is applied by any technique available in the art, without limit, with exemplary methods including ink jet printing, screen printing, gravure coating or masked spraying. The cathode layer may comprise a manganese dioxide layer either in addition to a polymer layer or instead of the polymer layer. The manganese dioxide layer is preferably formed by applying a solution of a manganese compound, such as manganese nitrate or a permanganate, followed by converting the manganese compound to manganese dioxide by heat. It is preferable that the manganese dioxide layer be deposited prior to deposition of the polymer; however, they can be added as a mixture.

The conductive layer may be formed in an area bound by an isolation material as known in the art. The method of forming the isolation material is not particularly limited herein. Methods of forming this isolating material for demonstration of the invention include but are not limited to removal of the porous layer and application of an isolating material in the removed portion, or the isolating material may be present in, or on, the porous layer. It is preferred to use the removal of the porous layer in combination of adding an isolating material so as to minimize wicking of the isolating material.

The method of electrically connecting the core, as an anode, and a conductive layer, as a cathode, of the capacitor to a circuit trace are not particularly limited herein. Methods which are particularly suitable for demonstrating the invention include, but are not limited to, through hole via connection, wire-bonding, soldering, welding, braising, plating, ultrasonic welding, laser welding or the like.

While illustrated as a capacitive couple with terminations of opposite polarity on opposing sides thereof, the one-sided foil may be used to form a capacitor with terminations of both the core and the conductive layer on a common side as known in the art. Furthermore, the capacitor may be isolated, or taken in groups, to form an embedded capacitor in a structure wherein layers are added thereto for termination as set forth in U.S. Pat. No. 7,833,292 wherein the one-sided capacitor foil can be incorporated into a layered structure for formation of a terminated capacitor. In another embodiment the instant capacitor may be embedded into a channel of a substrate with subsequent formation of connectivity on and around the channel as set forth in U.S. Pat. No. 7,745,281.

Carrier films may be incorporated, as known in the art, to facilitate manufacturing, transport and use of the capacitor and the capacitor may be formed into a layered substrate or diced to form discrete capacitors. A carrier film is particularly beneficial if arrays of capacitors are formed on a common foil. The carrier film may be located at any part of the capacitor, provided it forms a structural support to physically connect, at least temporarily, capacitors such as in an array. Multiple carrier films may be used either simultaneously or sequentially. Other possible uses for the carrier film can be a temporary structure for transferring the capacitor such as in an array. This can be achieve by the use of a material with releasing properties, such as but not limited to, thermal release film, pressure release film, soluble film, or other methods of removing the film once the capacitors have been transferred to the final placement. One preferred embodiment is the use of two carrier film layers. One carrier film is a double sided adhesive that bonds the capacitors in an array on one side and provides an adhesive surface for bonding the capacitors to a usable surface on the other. Once that adhesive layer is in contact with both the capacitors and the usable substrate, the second carrier film that is a release film can be detached leaving the capacitors present on the desired surface. In other embodiments the adhesive film is replaced by an adhesive applied to either the capacitors surface or the usable substrate.

The term isolating material describes any material that forms a physical, chemical, or electrical barrier. This term may be interchanged with masking material or damming material. It is understood in the industry that this isolating material can be applied by many methods, such as but not limited to deposition, transfer, screen printing, or spray. It is also understood that this material prevents the cathode materials from escaping beyond the boundaries created by this material. Part of this is accomplished by the isolating material penetrating into the porous anode layer so that wicking within the porous layer is also prevented. It is also possible, but not integral, that the isolating material resides above the porous anode layer surface as to prevent outer cathode materials from escaping beyond the boundaries.

The invention has been described with particular reference to preferred embodiments without limit thereto. One of skill in the art would realize additional embodiments and improvements which are not specifically enumerated but which are within the scope of the invention as specifically set forth in the claims appended hereto.

The invention claimed is:

1. A method of forming a capacitor comprising;
providing a foil comprising a conductive core comprising a valve metal and a high surface area layer on each side of a first side and a second side of said conductive core;
removing at least a portion of said high surface area layer on said first side of said conductive core;
forming a dielectric on only said high surface area layer on said second side;
forming a conductive cathode layer on said dielectric with an isolating material circumscribing an area of said conductive cathode layer wherein said forming of said conductive cathode is after said removing of said at least a portion of said high surface area layer; and
forming an anode termination on said first side of said conductive core.

2. The method of forming a capacitor of claim 1 wherein said removing of said high surface area layer is selected from chemical etching and physical removal.

3. The method of forming a capacitor of claim 2 wherein said chemical etching is etching by an alkali solution.

4. The method of forming a capacitor of claim 3 wherein said alkali solution is a sodium hydroxide solution or a potassium hydroxide solution.

5. The method of forming a capacitor of claim 2 wherein said physical removal is selected from the group consisting of plasma etching, laser ablation and polishing.

6. The method of forming a capacitor of claim 1 wherein said valve metal is selected from the group consisting of aluminum, tantalum, titanium, niobium zirconium and hafnium.

7. The method of forming a capacitor of claim 6 wherein said valve metal is selected from the group consisting of aluminum and tantalum.

8. The method of forming a capacitor of claim 1 wherein after said removing said first side has no more than 15 angstroms of oxide.

9. The method of forming a capacitor of claim 1 wherein after said removing said first side has a roughness of no more than 0.01 $m^2/g$.

10. The method of forming a capacitor of claim 1 wherein said second side has at least 25 angstroms of oxide.

11. The method of forming a capacitor of claim 1 wherein said second side has a roughness of at least 0.1 $m^2/g$.

12. The method of forming a capacitor of claim 1 further comprising forming a cathode termination in electrical contact with said conductive layer.

13. The method of forming a capacitor of claim 1 further comprising forming an anode termination in electrical contact with said conductive core.

14. The method of forming a capacitor of claim 1 wherein said conductive layer comprises at least one conductor selected from the group consisting of manganese dioxide and a conductive polymer.

15. The method of forming a capacitor of claim 14 wherein said conductive polymer comprises 3,4-ethylenedioxythiophene.

* * * * *